(12) United States Patent
Fishwick (10) Patent No.: US 11,941,757 B2
(45) Date of Patent: Mar. 26, 2024

(54) RENDERING VIEWS OF A SCENE IN A GRAPHICS PROCESSING UNIT

(71) Applicant: Imagination Technologies Limited, Kings Langley (GB)

(72) Inventor: Steven Fishwick, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 156 days.

(21) Appl. No.: 17/197,502

(22) Filed: Mar. 10, 2021

(65) Prior Publication Data

US 2021/0201573 A1   Jul. 1, 2021

Related U.S. Application Data

(63) Continuation of application No. 15/000,197, filed on Jan. 19, 2016, now Pat. No. 10,964,105.

(30) Foreign Application Priority Data

Jan. 19, 2015 (GB) .................................... 1500855
Oct. 15, 2015 (GB) .................................... 1518254

(51) Int. Cl.
| | | |
|---|---|---|
| G06T 17/20 | (2006.01) | |
| G06T 1/60 | (2006.01) | |
| G06T 11/40 | (2006.01) | |
| G06T 15/00 | (2011.01) | |
| G06T 15/04 | (2011.01) | |
| G06T 15/80 | (2011.01) | |

(52) U.S. Cl.
CPC ............ *G06T 17/20* (2013.01); *G06T 1/60* (2013.01); *G06T 11/40* (2013.01); *G06T 15/005* (2013.01); *G06T 15/04* (2013.01); *G06T 15/80* (2013.01); *G06T 2200/04* (2013.01); *G06T 2200/28* (2013.01)

(58) Field of Classification Search
None
See application file for complete search history.

(56) References Cited

U.S. PATENT DOCUMENTS

| | | |
|---|---|---|
| 2011/0148919 A1 | 6/2011 | Heggelund et al. |
| 2014/0354682 A1 | 12/2014 | Heggelund et al. |
| 2014/0375663 A1 | 12/2014 | Pfaffe |
| 2015/0379671 A1 | 12/2015 | Brothers et al. |
| 2016/0260241 A1 | 9/2016 | Jin |

FOREIGN PATENT DOCUMENTS

WO   2014209768 A1   12/2014

*Primary Examiner* — Kee M Tung
*Assistant Examiner* — Jed-Justin Imperial
(74) *Attorney, Agent, or Firm* — Potomac Law Group, PLLC; Vincent M DeLuca (57) ABSTRACT

Graphics processing systems may render multiple views of a scene (e.g. a sequence of frames) in a tile-based manner. Groups of views may be rendered together such that tiles from a group of views are rendered in an interspersed order such that at least one tile from each of the views in the group is rendered before any of the views of the scene in the group are fully rendered. In this way similar tiles from different views within a group may be rendered sequentially. If a particular rendered tile is similar to the next tile to be rendered then data stored in a cache for rendering the particular tile is likely to be useful for rendering the next tile. Therefore, when rendering the next tile less data needs to be fetched from the system memory which can significantly improve the efficiency of the graphics processing system.

19 Claims, 9 Drawing Sheets

RENDERING VIEWS OF A SCENE IN A GRAPHICS PROCESSING UNIT

CROSS-REFERENCE TO RELATED APPLICATIONS AND CLAIM OF PRIORITY

This application is a continuation under 35 U.S.C. 120 of application Ser. No. 15/000,197 filed Jan. 19, 2016, now U.S. Pat. No. 10,964,105, which claims foreign priority under 35 U.S.C. 119 from United Kingdom Application Nos. 1500855.0 filed Jan. 19, 2015 and 1518254.6 filed Oct. 15, 2015.

BACKGROUND

Graphics processing systems are used to render images of scenes in a computer system. An application, such as a game application, sends data describing objects in a scene to a graphics processing system, and the graphics processing system can operate to render an image of the scene from a particular viewpoint. The scene may be a three-dimensional (3D) scene, and objects within the scene may be described by primitives which have a position in the 3D scene and which can be textured and/or shaded to thereby apply appearance features, such as colour and lighting effects, to the primitive in the rendered image.

Figure 1:
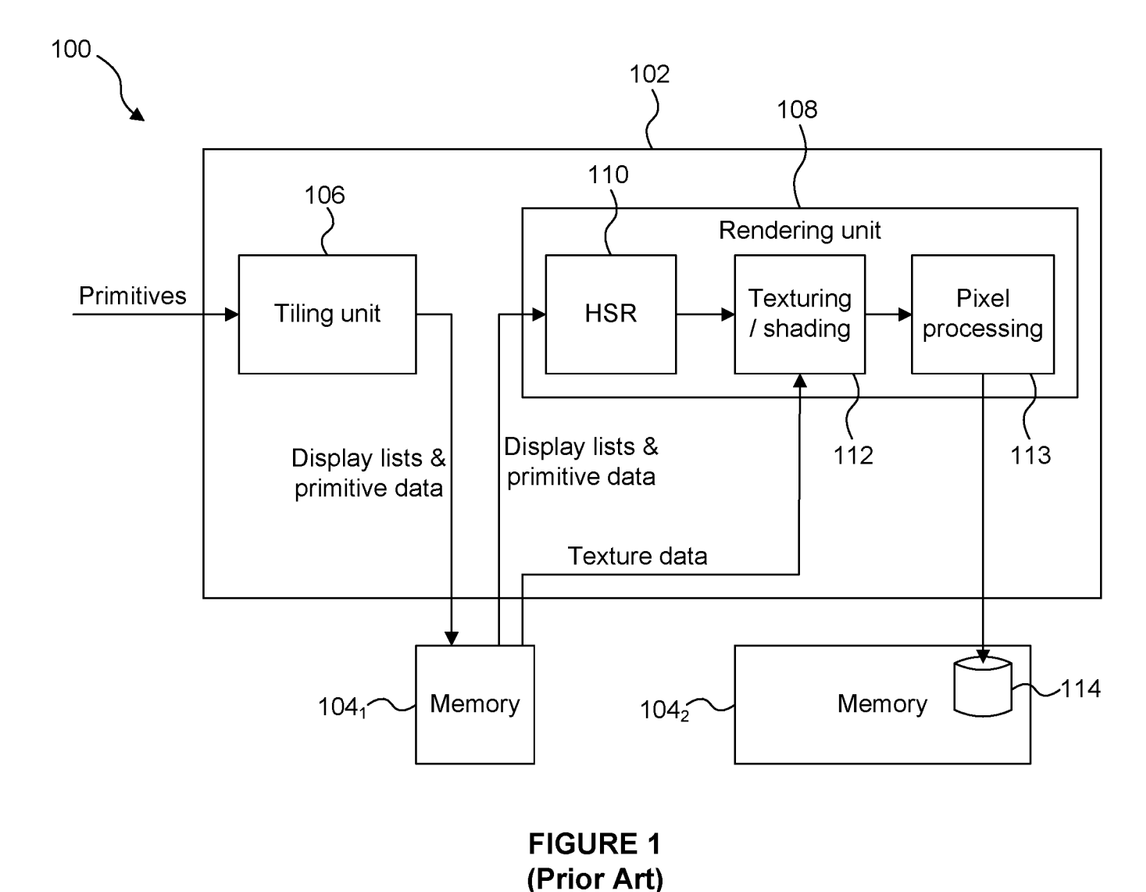
FIG. 1 is a schematic diagram of a graphics processing system in the prior art.

FIG. 1 shows some elements of a graphics processing system 100 which may be used to render an image of a 3D scene. The graphics processing system 100 comprises a graphics processing unit (GPU) 102 and two portions of memory $104_1$ and $104_2$. It is noted that the two portions of memory $104_1$ and $104_2$ may, or may not, be parts of the same physical memory, and both memories $104_1$ and $104_2$ are often situated "off-chip", i.e. not on the same chip as the GPU 102, and as such may be referred to as "system memory". Communication between the memories ($104_1$ and $104_2$) and the GPU 102 may take place over a conventional communications bus in the system 100, as is known in the art.

In the example shown in FIG. 1, the graphics processing system 100 is a tile-based deferred rendering system. The system 100 is "tile-based" in the sense that the rendering space of the system 100 is divided into a plurality of tiles which can be processed by the rendering unit 108 separately. The system 100 is a "deferred rendering system" in the sense that hidden surface removal is performed on a primitive fragment prior to performing texturing and/or shading on the primitive fragment in order to render the scene. However, it is noted that in other examples, graphics processing systems may be non tile-based and/or not deferred rendering systems. The GPU 102 comprises a tiling unit 106 and a rendering unit 108, wherein the rendering unit 108 comprises a hidden surface removal (HSR) module 110, a texturing/shading module 112 and pixel processing logic 113. The graphics processing system 100 is arranged such that sequences of primitives for images provided by an application are received at the tiling unit 106. The tiling unit 106 may perform functions such as clipping and culling to remove primitives which do not fall into a visible view. The tiling unit 106 may also transform the primitives into the rendering space for an image of the scene.

The tiling unit 106 determines display lists for tiles of images of the scene, wherein the display list for a tile indicates which of the primitives are relevant for rendering the tile. For example the display list for a tile indicates which primitives are present within that tile of the rendering space of the graphics processing system 100. The display lists and primitive data (e.g. the transformed primitive data which has been transformed into the rendering space for the image) are outputted from the tiling unit 106 and stored in the memory $104_1$. The rendering unit 108 fetches the display list for a tile and then fetches the primitive data relevant to that tile from the memory $104_1$ as indicated by the display list for the tile. The HSR module 112 performs hidden surface removal to thereby remove fragments of primitives which are hidden in the scene. The remaining fragments are passed to the texturing/shading module 114 which performs texturing and/or shading on the fragments to determine pixel values of a rendered image. The pixel processing logic 113 may process the pixel values, e.g. to apply compression or filtering to them, before passing the pixel values to the memory $104_2$ for storage in a frame buffer 114. The texturing/shading module 112 can fetch texture data from the memory $104_1$ in order to apply texturing to the fragments. The rendering unit 108 is configured to process each of the tiles of an image and when a whole image has been rendered and stored in the frame buffer 114 of the memory $104_2$, the image can be outputted from the graphics processing system 100 and, for example, may be displayed on a display. The rendering unit 108 may then render tiles of another image.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In previous graphics processing systems, such as the one described above with reference to FIG. 1, all of the tiles of a first image are rendered before any of the tiles of a second image are rendered. The inventor has appreciated that there may be some efficiency to be gained by rendering multiple views of a scene together as a group, wherein the tiles of the views of a group are rendered in an interspersed order such that at least one tile from each of the views of the scene in the group is rendered before any of the views of the scene in the group are fully rendered. The multiple views of the scene may represent the scene at different time instances (i.e. from temporally different viewpoints) and/or from spatially different viewpoints. For example, where the views of the scene are frames representing images of the scene at a sequence of time instances, two consecutive frames may be rendered in a group such that tiles of the two frames are rendered in an interspersed order, e.g. in an interleaved order such that a tile at a first tile position of the first frame is rendered then a tile at the first tile position of the second frame is rendered, then a tile at a second tile position of the first frame is rendered then a tile at the second tile position of the second frame is rendered, and so on. In examples described herein, tiles which are likely to be similar (i.e. tiles which are likely to have similar content) are rendered sequentially (i.e. one after another). Data, such as primitive data and texture data, may be fetched from a system memory and stored in a cache for use in rendering a particular tile. If the next tile that is rendered is similar to the particular tile then the data stored in the cache is likely to be useful for rendering the next tile. Therefore, when rendering the next tile less data needs to be fetched from the system memory (because some useful data is available in the cache). A significant part of the cost of rendering a view of a scene, in terms of power, time and/or use of processing resources, is caused by moving data between the graphics processing unit and the system memory, so if the amount of data that needs to be passed between the graphics processing unit and the system memory can be significantly reduced then the efficiency of the graphics processing system can be significantly improved.

There is provided a method of rendering views of a scene in a graphics processing unit which is configured to use a rendering space which is subdivided into a plurality of tiles, the method comprising: rendering tiles of the views of the scene in an interspersed order such that, for each group of a plurality of groups of views of the scene, at least one tile from each of the views of the scene in the group is rendered before any of the views of the scene in the group are fully rendered.

The method may further comprise: for each of the views of the scene, processing primitives of the view of the scene to determine, for each of the tiles of the view of the scene, which of the primitives are relevant for rendering the tile; wherein the determinations of which of the primitives are relevant for rendering tiles of views of the scene may be used for said rendering tiles of the views of the scene. For example, for each of the views of the scene, said processing primitives may comprise performing tiling on the primitives of the view of the scene to determine display lists for tiles of the view of the scene, wherein the display list for a tile indicates which of the primitives are relevant for rendering the tile; wherein the determined display lists may be used for said rendering tiles of the views of the scene. At least some of the views of the scene may be frames representing images of the scene at a sequence of time instances.

There is provided a graphics processing unit configured to render views of a scene, wherein the graphics processing unit is configured to use a rendering space which is subdivided into a plurality of tiles, the graphics processing unit comprising: a rendering unit configured to render tiles of the views of the scene in an interspersed order such that, for each group of a plurality of groups of views of the scene, at least one tile is rendered from each of the views of the scene in the group before any of the views of the scene in the group are fully rendered.

There may be provided computer readable code adapted to perform the steps of any of the methods described herein when the code is run on a computer. Furthermore, there may be provided computer readable code for generating a graphics processing unit according to any of the examples described herein. The computer readable code may be encoded on a computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only.

Figure 2:
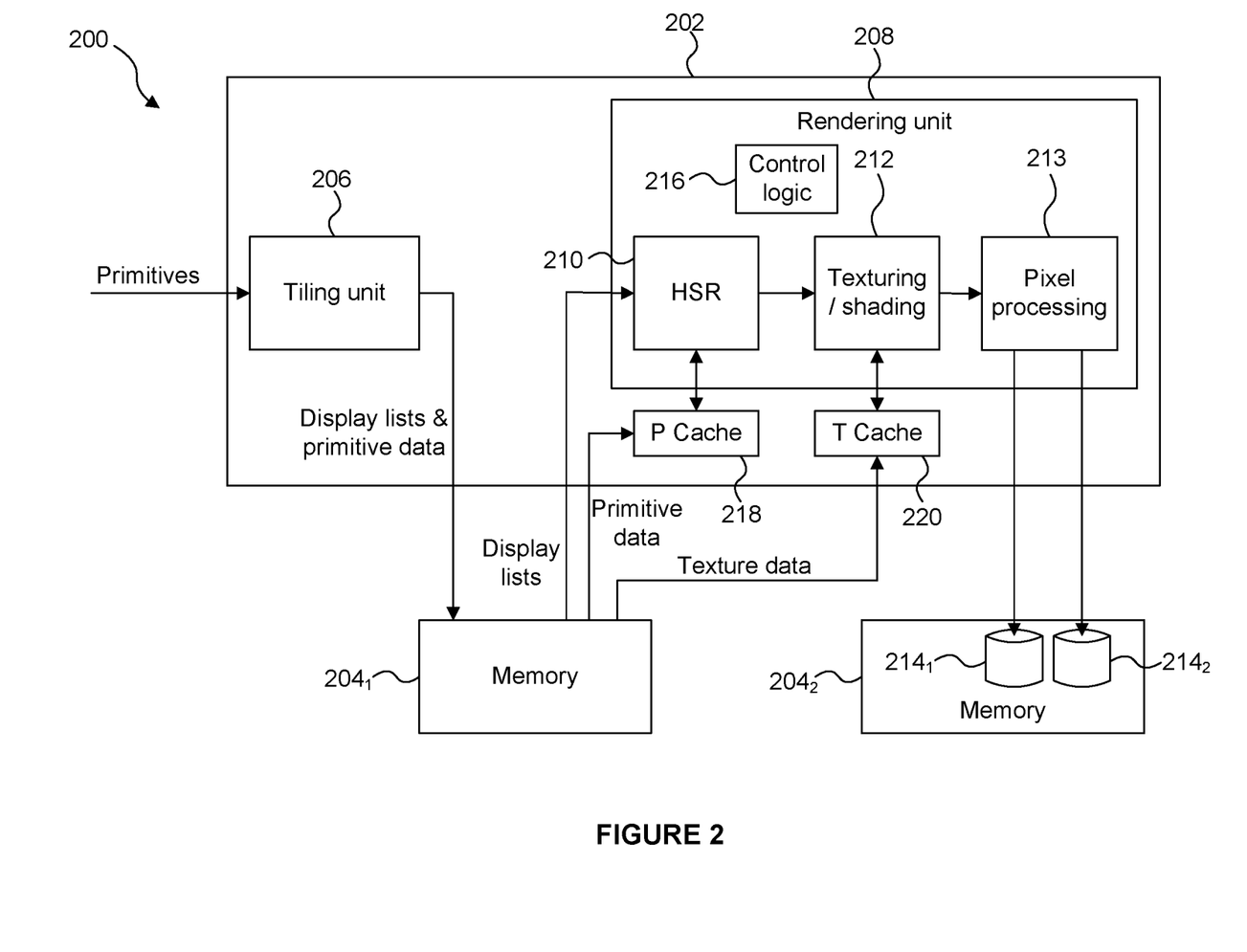
FIG. 2 is a schematic diagram of a graphics processing system according to an example described herein.

FIG. 2 shows some elements of a graphics processing system 200 which may be used to render an image of a 3D scene. The graphics processing system 200 comprises a graphics processing unit (GPU) 202 and two portions of memory $204_1$ and $204_2$. It is noted that the two portions of memory $204_1$ and $204_2$ may, or may not, be parts of the same physical memory, and for example both memories $204_1$ and $204_2$ may be situated "off-chip", i.e. not on the same chip as the GPU 202, and as such may be referred to as "system memory". Communication between the memories ($204_1$ and $204_2$) and the GPU 202 may take place over a conventional communications bus in the system 200, as is known in the art. The memory $204_2$ includes two buffers $214_1$ and $214_2$ for storing rendered pixel values of respective views of a scene. In other examples, more than two buffers 214 may be included in the memory $204_2$ as described in more detail below.

In the example shown in FIG. 2, the graphics processing system 200 is a tile-based deferred rendering system. However, in other examples, a graphics processing system may be non tile-based and/or not a deferred rendering system. The GPU 202 comprises a tiling unit 206 and a rendering unit 208, wherein the rendering unit 208 comprises a hidden surface removal (HSR) module 210, a texturing/shading module 212 (i.e. a processing module for performing at least one of texturing and shading on primitive fragments) and pixel processing logic 213. The rendering unit 208 also comprises control logic 216, a primitive cache 218 and a texture cache 220. It is noted that the two caches 218 and 220 may, or may not, be parts of the same physical memory, and are situated "on-chip", i.e. they are implemented as part of the GPU 202.

In operation, the graphics processing system 200 receives primitives of views of a scene and renders the views of the scene to thereby determine pixel values which can be displayed on a display to represent the views of the scene. For each view of the scene the tiling unit 206 processes primitives of the view of the scene to determine, for each of the tiles of the view of the scene, which of the primitives are relevant for rendering the tile. In particular, for each view of the scene the tiling unit 206 determines per-tile display lists for the tiles of the view of the scene to indicate which primitives are relevant for rendering the respective tiles. The rendering unit 208 then renders the tiles of the views and outputs the rendered pixel values to the frame buffers $214_1$ and $214_2$.

The views of the scene may be images of the scene which are to be rendered. For example the views of the scene may be frames representing images of the scene at a sequence of time instances. In other examples, at least two of the views of the scene may be images of the scene from respective different viewpoints. For example views of a scene from the viewpoints of different users may be rendered, for example if two users are playing the same game a respective view of the scene from the viewpoint of each of the users within the game is rendered. As another example, two views of a scene may correspond to a view of the scene from the viewpoint of a right eye and a view of the scene from a viewpoint of a left eye. This may be particularly useful for creating a 3D image in which the views from the right and left eyes are slightly different so as to create the perception of a 3D image of a scene. This can be useful for virtual reality applications.

Figure 3:
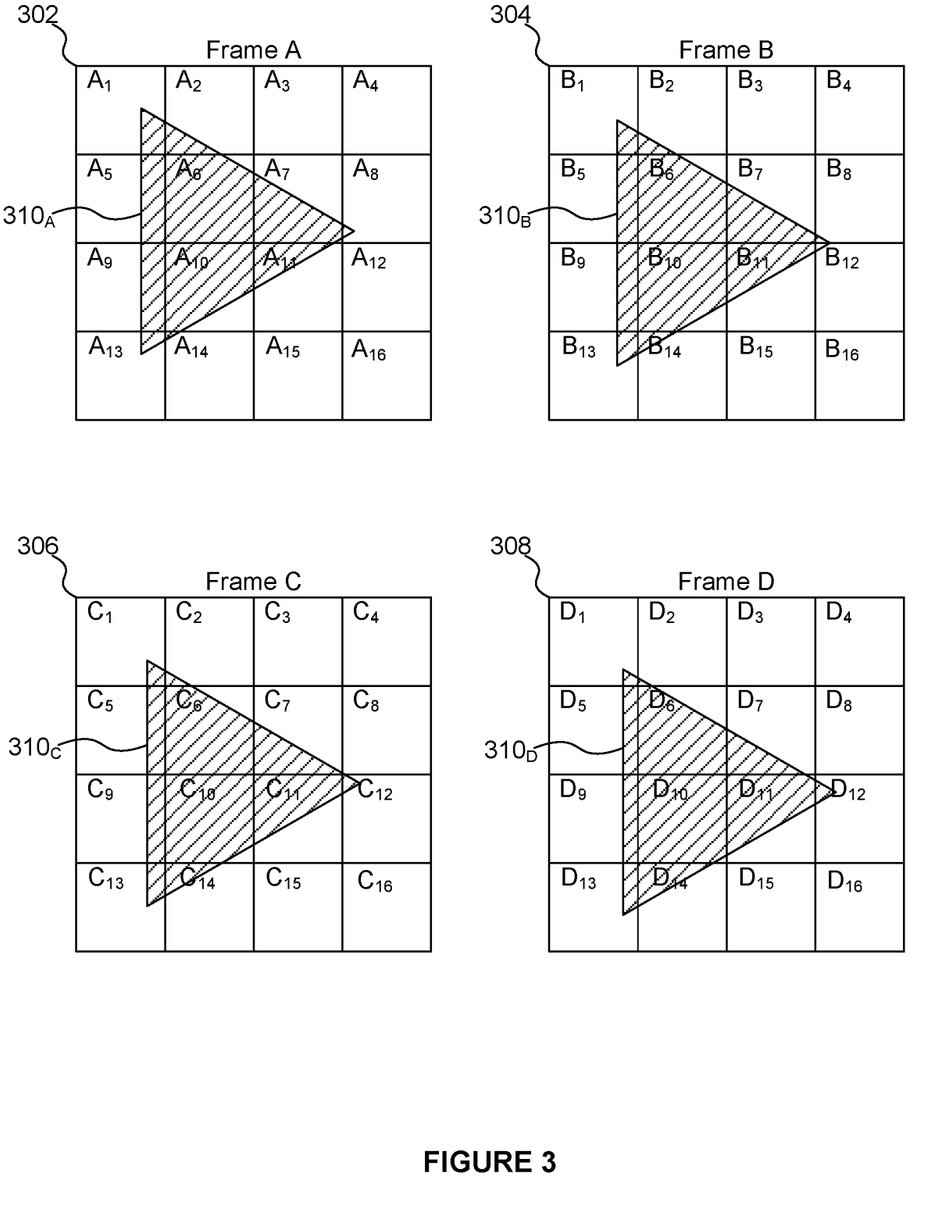
FIG. 3 shows a sequence of four frames which are to be rendered in an example.

FIG. 3 shows a sequence of four frames 302, 304, 306 and 308, labelled frames A to D. In the simple example shown in FIG. 3 each frame is rendered using sixteen tiles arranged in a 4×4 grid. Frame A 302 is rendered in tiles labelled $A_1$ to $A_{16}$; frame B 304 is rendered in tiles labelled $B_1$ to $B_{16}$; frame C 306 is rendered in tiles labelled $C_1$ to $C_{16}$, and frame D 308 is rendered in tiles labelled $D_1$ to $D_{16}$. The frames 302 to 308 represent images at a sequence of different time instances. For example, frame A may be intended to be displayed at time $t_A$ secs, frame B may be intended to be displayed at time $$\left(t_A + \frac{1}{k}\right) secs,$$

frame C may be intended to be displayed at time $$\left(t_A + \frac{2}{k}\right) secs,$$

and frame D may be intended to be displayed at time $$\left(t_A + \frac{3}{k}\right) secs,$$

where the frame rate is k Hz. To give some examples, k may be 25, 30, 50, 60 or 100, but other frame rates may be used as would be apparent to a person skilled in the art. A primitive 310 is present in each of the frames A to D, and as shown in FIG. 3, the primitive 310 moves slightly between the frames, but corresponding tiles are similar from one frame and the next frame in the sequence. FIG. 3 is a much-simplified example, and in other examples there will likely be many primitives present in each of the frames.

Figure 4:
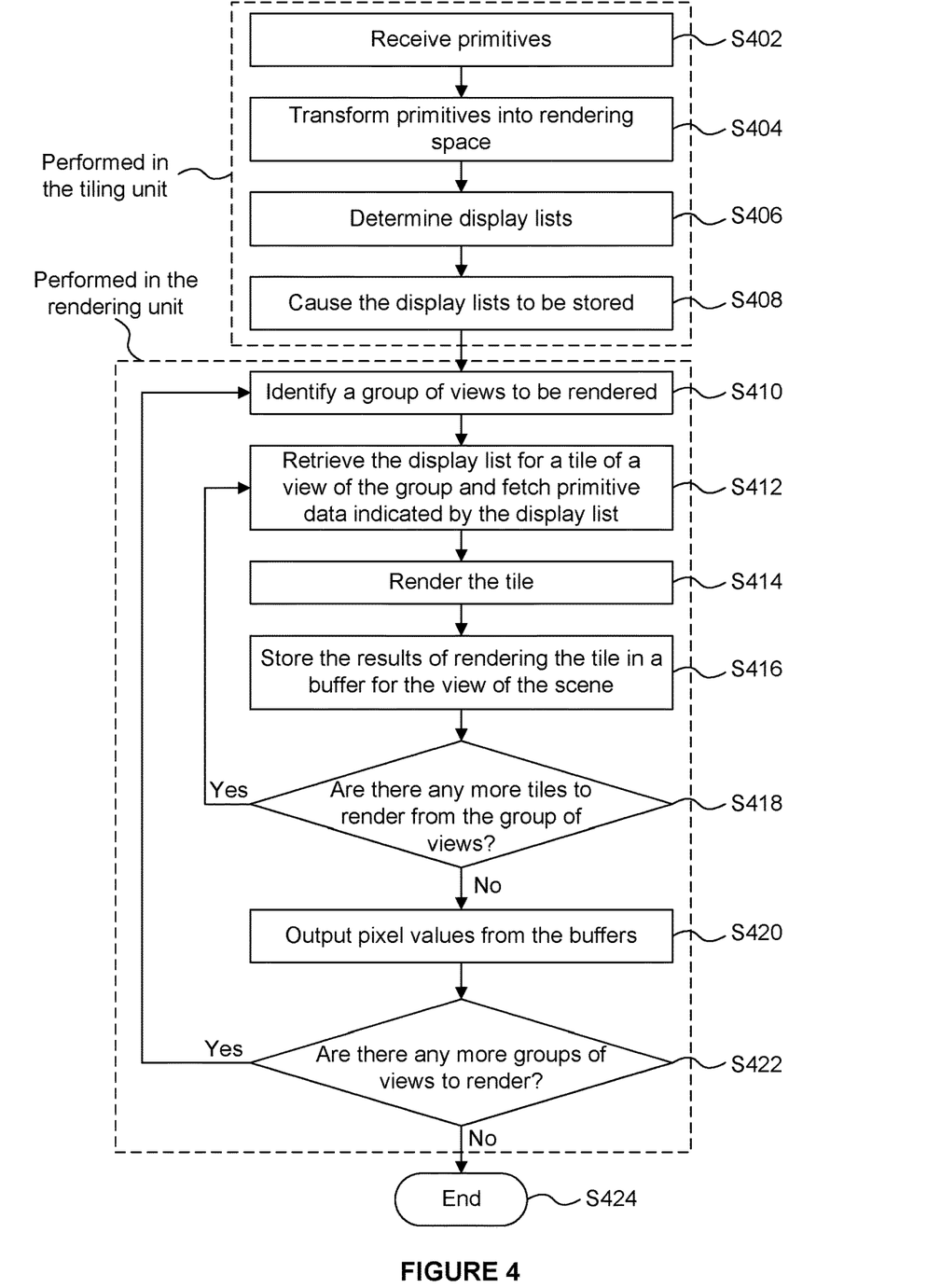
FIG. 4 is a flowchart for a method of rendering views of a scene in a graphics processing system according to examples described herein.

FIG. 4 shows a flow chart of a method for rendering views of a scene in the graphics processing system 200. In step S402 the graphics processing system 200 receives primitives of views of a scene (e.g. primitives of the frames 302 to 308). The primitives are passed to the tiling unit 206. The tiling unit 206 may perform functions such as clipping and culling to remove primitives which do not fall into a visible view.

In step S404 the tiling unit 206 transforms primitives of a view of the scene into the rendering space for the view of the scene, so that the tiling unit 206 can determine which primitives are present within each of the tiles of the rendering space for the view of the scene, i.e. which primitives are relevant for rendering each of the tiles. Methods for performing the transformation of the primitives into the rendering space of a view of the scene are known in the art, and for conciseness, the details of such transformation methods are not described herein.

In step S406, the tiling unit 206 determines display lists for tiles of views of the scene, wherein the display list for a tile indicates which of the primitives are relevant for rendering the tile. That is, the tiling unit 206 determines per-tile display lists which indicate which primitives are present within each of the tiles of the rendering space. For example, the display list for a tile indicates which primitives are present within that tile of the rendering space of the graphics processing system 200. The display list for a tile may include primitive identifiers to indicate which of the transformed primitives are relevant for rendering a tile. Alternatively, the display list for a tile may include primitive identifiers to indicate which of the untransformed primitives are relevant for rendering a tile.

In the examples described herein there are references to there being a display list for each tile, wherein the display list for a tile includes indications of primitives (i.e. primitive IDs) which are present within the tile. In some examples each tile may have a separate display list which is stored as a separate data structure. However, it is noted that in some other examples, there is not necessarily a separate data structure acting as a separate display list for each separate tile. However, even in these cases, for each tile, there is a display list that indicates which primitives are present within the tile, and in that sense there is a display list for each tile. That is, the same data structure may include primitive IDs for more than one tile with indications as to which tile each primitive ID relates, such that the data structure can act as a display list for more than one tile. In other words, conceptually it makes sense to think of there being a separate display list for each tile, whereas in reality in some examples the display lists for multiple tiles may be combined into a single data structure with indications as to which tile each primitive ID in the data structure relates. Throughout this application there are references to display lists for tiles, and such references are intended to cover examples in which separate display lists are implemented as separate data structures and also examples in which the display lists for multiple tiles may be combined into a single data structure with indications as to which tile each primitive ID in the data structure relates.

In step S408 the tiling unit 206 causes the display lists for the tiles of the views of the scene to be stored in the memory $204_1$. The display lists are therefore sent from the tiling unit 206 to the memory $204_1$ for storage therein. If the display lists include identifiers of the transformed primitives then primitive data for the transformed primitives may also be sent from the tiling unit 206 to the memory $204_1$ for storage therein (as indicated in FIG. 2). The rendering unit 208 can retrieve the display list for a tile and fetch the primitive data describing the transformed primitives which are relevant for rendering the tile from the memory $204_1$, as indicated by the display list for the tile. In this way the rendering unit 208 does not need to perform transformations to determine the transformed primitives. However, in other examples, the display lists include identifiers of the untransformed primitives. In which case, and in contrast to the indication in FIG. 2, the transformed primitive data does not need to be sent from the tiling unit 206 to the memory $204_1$. Instead the untransformed primitives are stored in the memory $204_1$ as well as being provided to the tiling unit 206. The rendering unit 208 can retrieve the display list for a tile and fetch the primitive data describing the untransformed primitives which are relevant for rendering the tile from the memory $204_1$, as indicated by the display list for the tile. The rendering unit 208 can then perform transformations to determine the transformed primitives which can then be used to render the tile. Therefore in these examples, both the tiling unit 206 and the rendering unit 208 perform transformations to determine the transformed primitives for a tile, so some extra processing is performed, but the amount of storage used in the memory $204_1$ is reduced since the transformed primitives do not need to be stored there, and perhaps more significantly, the amount of data passed between the memory $204_1$ and the GPU 202 is reduced since the transformed primitive data does not need to be passed from the tiling unit 206 to the memory $204_1$. Reducing the amount of data passed between the memory $204_1$ and the GPU 202 may significantly improve the efficiency of the graphics processing system 200. Furthermore, the untransformed primitive data is likely to be useful for corresponding tiles in a sequence of views (e.g. in a sequence of frames), so in the examples described herein, the untransformed primitive data may only need to be fetched from the memory $204_1$ once and stored in the cache 218 for use in rendering more than one tile. The untransformed primitives may be the same for a sequence of views, whereas the corresponding transformed primitives might not be the same for the sequence of views, e.g. if the primitives have moved, or if the viewpoint from which the views are rendered changes, over the sequence of views.

The rendering unit 208 renders tiles of views of the scene. The rendering unit 208 might render one tile at a time or it might have "multiple tiles in flight" meaning that more than one tile may be partially processed within the rendering unit 208 at a given time. In prior art tile-based graphics processing systems, all of the tiles of one view of a scene are rendered, such that the view is fully rendered, and then tiles from another view of the scene are rendered. In contrast, in examples described herein a group of views are rendered together. The group of views includes more than one view of the scene. The views within a group are preferably similar to each other, i.e. they preferably include similar content such that they may share data such as primitive data and texture data. This means that data stored in the primitive cache 218 and the texture cache 220 for rendering a tile is likely to be useful for rendering the next tile, such that the cache hit rates of the caches 218 and 220 increases, thereby reducing the amount of data (e.g. primitive data and texture data) which needs to be fetched from the memory $204_1$. Reducing the amount of data that is passed between the memory $204_1$ and the GPU 202 can significantly improve the efficiency (e.g. in terms of speed and power consumption) of the graphics processing system 200. Tiles of the views within a group are rendered in an interspersed order such that the view from which a tile is rendered may switch back and forth between different views from the group. In this way, at least one tile from each of the views of the scene in the group is rendered before any of the views of the scene in the group are fully rendered. As an example, tiles from different views of a group may be rendered in an interleaved order such that a tile from a particular tile position is rendered for each of the views in the group and then a tile from a next tile position is rendered for each of the views in the group, and so on. In other examples, the control logic 216 may determine the order in which tiles from the views of a group are rendered in such a way that similar tiles are rendered sequentially (i.e. consecutively, that is, one after another) by the rendering unit 208. As mentioned above, the examples described herein have the benefit that the caches and memories in the GPU 102 may be more likely to stay full of relevant data compared to systems in which one frame is processed to completion before returning to a particular tile location for the next frame. The operation of the rendering unit 208 is described in more detail below with reference to steps S410 to S422.

In step S410 a group of views is identified which are to be rendered together. For example, views of the scene may be rendered in pairs, such that there are two views of a scene in a group. For example, with reference to the example shown in FIG. 3, a number of consecutive frames may be included in the same group, e.g. frame A 302 and frame B 304 may be rendered together as a first group, and frame C 306 and frame D 308 may be rendered together as a second group. The number of views of a scene included in a group to be rendered together may be greater than two, and may be controlled by the control logic 216. Increasing the number of views included in a group may increase the efficiency saving that can be achieved since there is more opportunity to share data between tiles of different views. For each additional view that is included in a group, it becomes increasingly cheap (in terms of power and speed) to render the tiles of the views because the cache hit rates increase. However, increasing the number of views included in a group is likely to increase the amount of time between starting to render tiles of a view of the group and finishing rendering all of the tiles of the view. Therefore there is a trade-off which may be considered by the control logic 216 when determining how many views to include in a group. For example, if the views of the scene which are rendered are being output in real-time, e.g. for display to a user in real-time, then the delay between submitting a view of a scene for rendering and receiving the resultant rendered image of the scene is preferably kept low enough for the delay not to be irritating to the user; therefore in this situation the number of views of a scene included in a group may be set to be relatively low, e.g. two. However, if the views of the scene which are rendered are not being output in real-time, e.g. the images are being rendered "offline" in advance of them being displayed to a user, then the delay between submitting a view of a scene for rendering and receiving the resultant rendered image of the scene is not so important, so to improve the efficiency of the rendering in this situation the number of views of a scene included in a group may be set to be relatively high, e.g. five or more. There is no hard upper limit to the number of views of a scene included in a group, and sometimes it may be much higher than five. For example, in movie rendering applications, it could be beneficial for the group to include frames spanning between scene cuts which may take several seconds, e.g. five seconds of a movie at 24 frames per second would be 120 frames and it may be beneficial for all of these frames to be included in a group. There may be other suitable ways to allocate the views of the scene into groups to be rendered, which may be suited to the way in which the views are to be rendered. The number of buffers 214 in the memory $204_2$ is greater than or equal to the number of views in a group, so that for each view in a group there is a respective buffer 214 in the memory $204_2$.

In step S412 the rendering unit 208 retrieves, from the memory $204_1$, the display list for a tile of a view from the identified group of views. The rendering unit 208 then fetches the primitive data which is identified in the display list for the tile. The primitive data is stored in the primitive cache 218. As is known in the art, the primitive data describes features of the primitives which are present in the tile being rendered. The features of a primitive which are described by the primitive data may include the position of the primitive (e.g. given by x, y and z co-ordinates of vertices of the primitive), an indication of a texture to be applied to the primitive, a type (e.g. opaque or translucent) which indicates how the primitive should be processed in the rendering unit 208 and other features of the primitive. As described above, the primitive data which is fetched may relate to transformed or untransformed primitives in different examples. If the fetched primitive data is untransformed primitive data then a transformation operation may be applied in the rendering unit 208 in order to transform the primitives into the rendering space of the view for which a tile is being rendered.

In step S414 the rendering unit 208 renders the tile. The rendering of the tile includes the HSR module 210 performing hidden surface removal (HSR) on the primitives which are present in the tile to thereby remove fragments of primitives which are hidden from view, e.g. if they are located behind other opaque primitive fragments from the viewpoint from which the view is being rendered. As is known in the art, HSR may involve performing depth tests on the primitive fragments using a depth buffer (or "Z buffer"). Primitive fragments which are not removed by the HSR module 210 (e.g. fragments which pass their depth tests in the HSR module 210) are passed to the texturing/shading module 212. The texturing/shading module 212 is a processing module which is configured to perform at least one of texturing and shading on the fragments to determine pixel values of a rendered image. The texturing/shading module 212 can fetch texture data from the memory $204_1$ in order to apply texturing to the fragments. The texture data which is fetched from the memory $204_1$ is stored in the texture cache 220. It is noted that the texture data often forms the largest proportion of the data that is passed from the memory $204_1$ to the GPU 202 for the purpose of rendering a view of the scene. The pixel processing logic 213 may process the pixel values, e.g. to apply compression and/or filtering to them.

In step S416 the results of rendering the tile, i.e. the pixel values of the rendered image in the example described above, are passed to the memory $204_2$ for storage in an appropriate one of the buffers 214. As described above, for each of the views within the group that are being rendered together there is a respective buffer 214 in the memory $204_2$. It can be appreciated that FIG. 2 shows just two buffers 214, but in other examples in which more than two views may be included in a group, there would be more than two buffers 214 in the memory $204_2$ accordingly.

In step S418 the control logic 216 determines whether there is another tile to render from the current group of views. If there is another tile to render from the current group of views then the method passes back to step S412 and the display list for the next tile to be rendered from the current group of views is retrieved from the memory $204_1$, and steps S412 to S418 are carried out to render the next tile. In some examples, the next tile to be rendered follows a sequence such that no active decision as to which tile to render next has to be performed. For example, the tiles may be rendered in an interleaved order in which a tile at a first tile position is rendered from each of the views of the scene in a group, and subsequently a tile at a second tile position is rendered from each of the views of the scene in the group, and so on. For example, with reference to FIG. 3, if frames A and B are in a group to be rendered together then the tiles may be rendered in an order: $A_1, B_1, A_2, B_2, A_3, B_3, \ldots$. In this example, the view from which a next tile is rendered is changed after rendering one tile from a particular view, whereas in other more general examples, the view from which a next tile is rendered is changed after rendering a set of one or more tiles from a particular view, wherein the set does not include all of the tiles of the particular view of the scene. For example, with reference to FIG. 3, if frames A and B are in a group to be rendered together then the tiles may be rendered in an order: $A_1, B_1, B_2, A_2, A_3, B_3, B_4, A_4, A_5, B_5, B_6, A_6 \ldots$. This order has the same advantage as the interleaved order given above in that tiles at the same tile position from different views are rendered consecutively (i.e. sequentially), but also when the tile position from which a tile is rendered changes, the view from which the tile is rendered does not change. This may increase the similarity between consecutively rendered tiles, which as described above may improve the efficiency of the graphics processing system 200, e.g. by improving the cache hit rates of the primitive cache 218 and the texture cache 220. As an example, the similarity between tiles $B_1$ and $B_2$ may be likely to be higher than the similarity between tiles $B_1$ and $A_2$, so after rendering tile $B_1$ it may be advantageous to render tile $B_2$ rather than tile $A_2$ next.

In another example, the tiles of frames A and B may be rendered such that a set of tiles from frame A is rendered then a corresponding set of tiles is rendered from frame B. For example, if there are four tiles in a set, the tiles may be rendered in an order: $A_1, A_2, A_3, A_4, B_1, B_2, B_3, B_4, A_5, A_6, A_7, A_8, B_5, B_6, B_7, B_8$, and so on. The number of tiles in a set may be selected depending on the amount of data that can be stored in the caches 218 and 220, so that data for at least all of the tiles in a set (e.g. for at least four tiles in the example given above) can be stored in the caches 218 and 220 at a given time, to thereby achieve the efficiency gains described herein resulting from improved cache hit rates.

Whilst the order in which the tiles are rendered may follow an interspersed sequence as described above, in other examples, the control logic 216 may control the order in which the tiles are rendered. That is, the control logic 216 may determine which tile to render after a particular tile has been rendered. The control logic 216 may implement a mechanism for predicting which tiles correspond with each other from different views of the scene. Such a mechanism may be different in different examples, as described in more detail below. The control logic 216 may determine a tile from the current group of views which is likely to be similar to the particular tile which has just been rendered and may cause that tile to be rendered next. In this way the likelihood is increased that the data stored in the caches 218 and 220 at the end of rendering a particular tile is relevant for rendering the next tile, thereby increasing the cache hit rates. Some examples of how the control logic 216 determines the order in which the tiles are rendered are described below with reference to FIG. 5.

If in step S418 it is determined that there are no more tiles to render from the current group of views then the views of the scene in the current group have been fully rendered such that the pixel values in the buffers 214 represent the fully rendered views of the scene. The method then passes to step S420 in which the pixel values in the buffers 214 are output, e.g. for display to a user, for storage in a memory, or for transmission to another device. This makes the buffers 214 available for storing the results of rendering further tiles of further views of the scene.

In step S422 the control logic 416 determines whether there is another group of views to render. If there are no more groups of views to render then the method ends in step S424. However, if there are more groups of views for which tiling has been performed but which have not yet been rendered then the method passes back to step S410 in which another group of views is identified, wherein the tiles of the identified group are to be rendered together in an interspersed order. Steps S412 to S422 are then repeated for the identified group of views to thereby render the views from the identified group.

Figure 5:
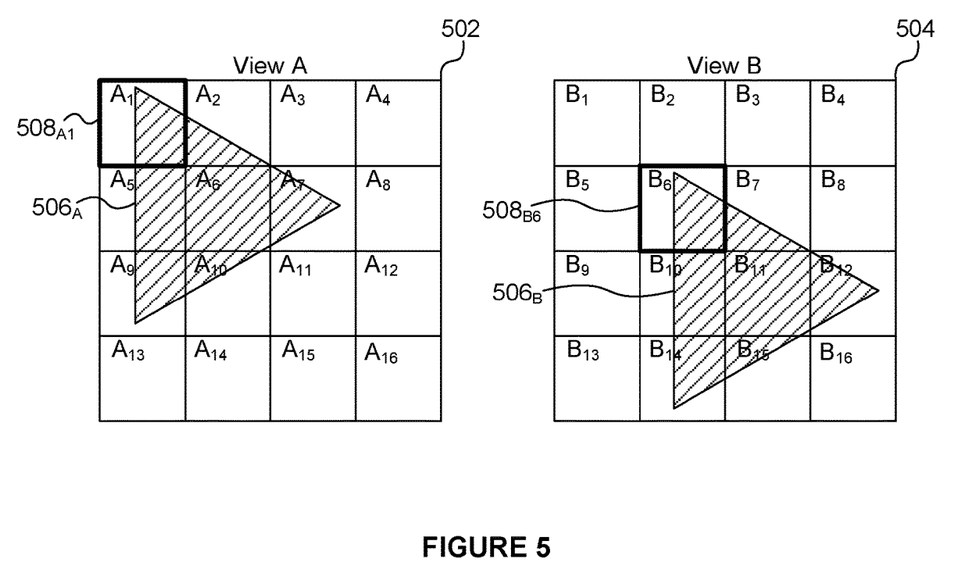
FIG. 5 shows two similar views of a scene which are to be rendered in an example.

FIG. 5 shows an example of two views of a scene: view A 502 and view B 504, which are to be rendered together as part of the same group of views. The two views of the scene show a primitive 506 which is located in a significantly different part of the rendering space in the different views 502 and 504. For example, views A and B may be consecutive frames such that they represent views of the scene at different time instances and the primitive 506 may have moved between the time of frame A and the time of frame B. It can be seen in FIG. 5 that some tiles of view A 502 are similar to tiles of view B 504 but at different positions within the rendering space. For example, tile $A_1$ (indicated with reference $508_{A1}$) is similar to tile $B_6$ (indicated with reference $508_{B6}$). Indications of motion between the views may be described by motion vectors. Motion vectors may be provided with the primitive data that is provided from an application for rendering by the graphics processing system 200, wherein the motion vectors indicate motion between the tiles of a particular view (e.g. view A 502) and regions of a different view (e.g. view B 504). For example, a motion vector may indicate that there is motion from a region corresponding to tile $508_{A1}$ in view A to a region approximately corresponding to tile $508_{B6}$ in view B. The rendering unit 208 can obtain the motion vectors and can select a tile (e.g. tile $508_{B6}$) to be rendered after a particular tile (e.g. tile $508_{A1}$) has been rendered based on the obtained motion vectors.

In another example, the views 502 and 504 may be two views of a scene from different viewpoints. This can be useful if a 3D image of a scene is to be rendered (e.g. for a virtual reality application) whereby the two views 502 and 504 may correspond to views of the scene from the viewpoint of a right eye and a left eye respectively. The two views 502 and 504 may be at approximately the same time instance, but due to the different viewpoints, a primitive 506 may be located at a different position in the rendering space of view A 502 than in the rendering space of view B 504, e.g. as shown in FIG. 5. In this case there will not be motion vectors to indicate which tiles are likely to be similar in the different views. However, for the case in which the two views represent a right eye viewpoint and a left eye viewpoint, there may be a known relationship between the positions of primitives in the two different views. Such a relationship could be used by the rendering unit 208 in order to select a tile (e.g. tile $508_{B6}$) to be rendered after a particular tile (e.g. tile $508_{A1}$) such that similar tiles from the different views are rendered sequentially.

In another example in which the views 502 and 504 may be two views of a scene from different viewpoints, the views may be for two different users (user A and user B) who are interacting with the scene, for example in a multiplayer game where different users can interact independently with the scene. The two views 502 and 504 may be at approximately the same time instance, but due to the different viewpoints, a primitive 506 may be located at a different position in the rendering space of view A 502 than it is located in the rendering space of view B 504, e.g. as shown in FIG. 5. In this case there might not be a known relationship between the positions of primitives in the two different views. However, in this case, when deciding which tile to render after a particular tile has been rendered, the control logic 216 may analyse at least one previous view of the scene to determine respective measures of similarity between a tile at the tile position of the particular tile and tiles at other tile positions, and then the control logic 216 may select a tile to be rendered after the particular tile based on the similarity measures. For example, the analysis of previous views of the scene at earlier time instances may indicate that tile $508_{A1}$ from the viewpoint of user A is similar to the tile $508_{B6}$ at the same time instance, and as such the control logic 216 may select tile $508_{B6}$ to be rendered after tile $508_{A1}$.

There may be at least one transformation which indicates tiles which are likely to be similar in different ones of the views of the scene in a group. For example with reference to FIG. 5, a transformation may indicate that a tile at column x and row y in view 502 is likely to be similar to a tile at column x+1 and row y+1 in view 504. Such a transformation would indicate that the tile $508_{A1}$ in view A 502 is likely to be similar to the tile $508_{B6}$ in view B 504.

In some examples, the control logic 216 could dynamically adapt the order in which tiles are rendered within a group, and/or dynamically adapt the views which are included in the groups, e.g. based on an analysis of average cache hit rates, to thereby attempt to increase the cache hit rates.

In the examples described above, the views of the scene are rendered to provide images comprising rendered pixel values. However, in other examples, at least one of the views of the scene represents a sub-rendering for use in rendering another view of the scene, wherein that other view of the scene may be an image. In other words, the result of a sub-rendering is not a frame, but is instead for use in rendering a frame. A sub-rendering is usually (but not necessarily) performed for the same time instance of the scene as the rendering of the scene which uses that sub-rendering. In other words, usually the sub-rendering and the other view of the scene for which the sub-rendering is performed, relate to the same time instance. For example, the sub-rendering may be a shadow map, an environment map or a texture for use in rendering the other view of the scene. In order to render a shadow map for a scene, the scene is rendered from at least one viewpoint of a respective at least one light source. For each light source viewpoint, and for each primitive fragment of the scene, an indication of whether the primitive fragment is visible from the viewpoint of the light source is stored. These indications can then be used to apply shadow effects to an image which is rendered from a user viewpoint. As another example, the sub-rendering may be an environment map which can be used to provide a view from a viewpoint other than the user viewpoint, which can be useful for effects such as reflections. For example, if a reflective object is present in a scene to be rendered, then the scene can be rendered from the viewpoint of the surface of the reflective object, wherein the result of this rendering is the environment map for the reflective object. The environment map can be used when the scene is rendered from the user viewpoint to determine how the surface of the reflective object is to appear in the rendered image (e.g. by applying the environment map to the surface of the reflective object in a similar manner to the way textures are applied to surfaces of objects during rendering). More generally, as another example, the sub-rendering may be a texture for use in rendering another view of the scene. That is, the results of rendering a view may be stored as a texture to be applied to one or more primitive fragments in another view of the scene. A "render to texture" technique such as this may be used, as an environment map as described above, to include reflections in an image. For example, in order to apply a texture to a reflective surface such as a mirror, a view of the scene from the viewpoint of the reflection in the surface may be rendered and stored as a texture which can then be applied to the surface when an image is rendered of the scene from a user viewpoint. Since sub-renderings tend to be rendered from a different viewpoint to the user viewpoint from which the subsequent view of the scene is rendered using the sub-rendering, it is particularly useful to use one or more transformations to indicate tiles which are likely to be similar in the sub-rendering and the subsequent rendering. This is because different tiles may represent the same region of the scene in the sub-rendering and the subsequent rendering because of the different viewpoints. As described above, the interspersed order in which the tiles are rendered from the sub-rendering and the subsequent rendering may be based on the one or more transformations such that similar tiles from the views of the scene in the group are rendered sequentially.

Figure 6:
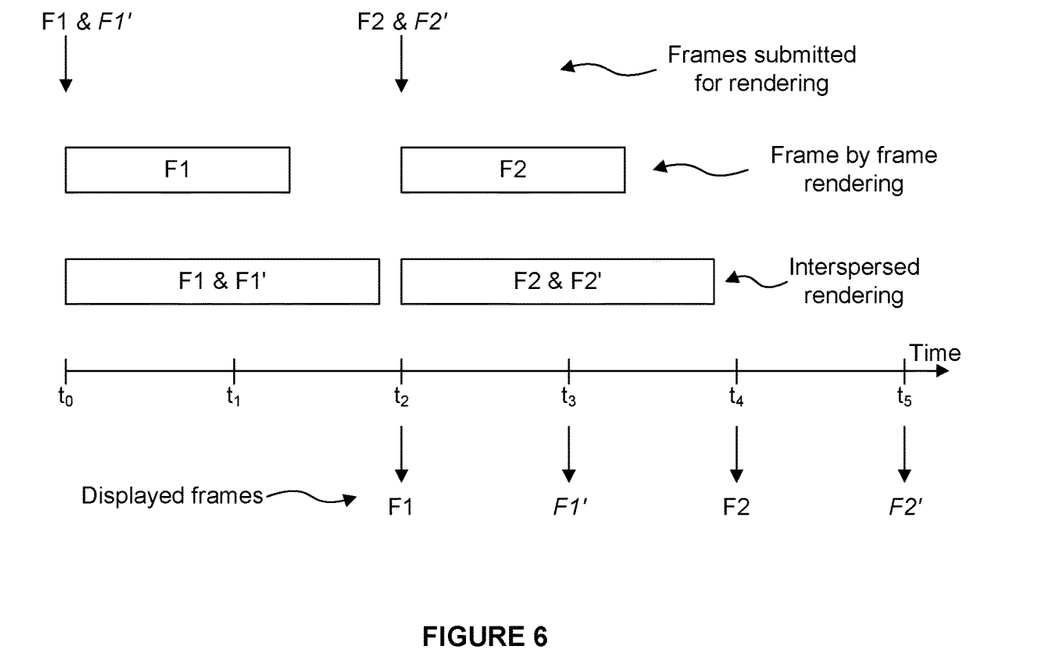
FIG. 6 shows a timing diagram illustrating the timing with which frames are rendered in an example.

FIG. 6 shows a timing diagram illustrating the timing with which frames are rendered in an example, and in particular shows how the frame rate can be increased by implementing the principles described herein. FIG. 6 shows a time axis with times $t_0$ to $t_5$ indicated, which are the times at which frames may be output from a display. For example, for a k Hz display, the time difference between consecutive ones of the indicated times is 1/k where k may tor example be 60. In other examples k may have other suitable values. The rendering of a frame by a GPU is a complex task and it may, for example, take approximately $\frac{1}{50}$ secs to render a frame. So if a first frame F1 is submitted for rendering at a time t0 then it may be ready to be displayed on a display approximately $\frac{1}{50}$ secs later, but in an example in which the frame rate of the display is 60 Hz, the frame F1 is not ready to be outputted at time $t_1$, and instead is output at time $t_2$. In a system in accordance with the prior art in which the tiles of one frame are all rendered before tiles of the next frame are rendered (referred to as "frame by frame rendering" in FIG. 6), a next frame (frame F2) can be submitted for rendering after the first frame (frame F1) has been rendered. Therefore, frame F2 can be submitted for rendering at time $t_2$ and can be ready for display at time $t_4$.

As described above, a significant portion of the time taken to render a frame is spent passing data between the GPU (e.g. GPU 202) and the system memory (e.g. memories $204_1$ and $204_2$). Therefore, by using the interspersed rendering technique of the examples described herein in which the tiles of a group of frames can be rendered in an interspersed order to thereby improve the cache hit rates, the frame rate which can be displayed may be able to be increased. For example, frames F1 and F1' may be submitted for rendering together at time to. Although each individual frame takes approximately $\frac{1}{50}$ secs to render, as described above the graphics processing system 200 can render two frames in a group more efficiently than rendering two separate frames, in a frame by frame manner. Therefore the time taken to render the two frames F1 and F1' in the examples described herein is less than $$\left(2 \times \frac{1}{50}\right) secs,$$

and in particular may be less than 2/60 secs. If this is the case then, as shown in FIG. 6, when interspersed rendering is implemented according to the examples described herein then both of the frames F1 and F1' may be fully rendered before time $t_2$. Therefore, as shown in FIG. 6, frame F1 can be displayed at time $t_2$ and frame F1' can be displayed at time $t_3$. Similarly, frames F2 and F2' can be submitted for rendering together as a group at time $t_2$, such that both frames F2 and F2' may be rendered before time $t_4$, so that frame F2 can be displayed at time $t_4$ and frame F2' can be displayed at time $t_5$.

The example shown in FIG. 6 illustrates that by rendering groups of frames together using the interspersed rendering technique, the displayed frame rate can be increased (in the example shown in FIG. 6 the displayed frame rate is doubled). That is, with previous systems which implement frame by frame rendering, frames F1 and F2 are displayed at times $t_2$ and $t_4$ but frames F1' and F2' are not displayed, whereas with the interspersed rendering techniques described herein frames F1, F1', F2 and F2' can be displayed respectively at times $t_2$, $t_3$, $t_4$ and $t_5$.

Figure 7:
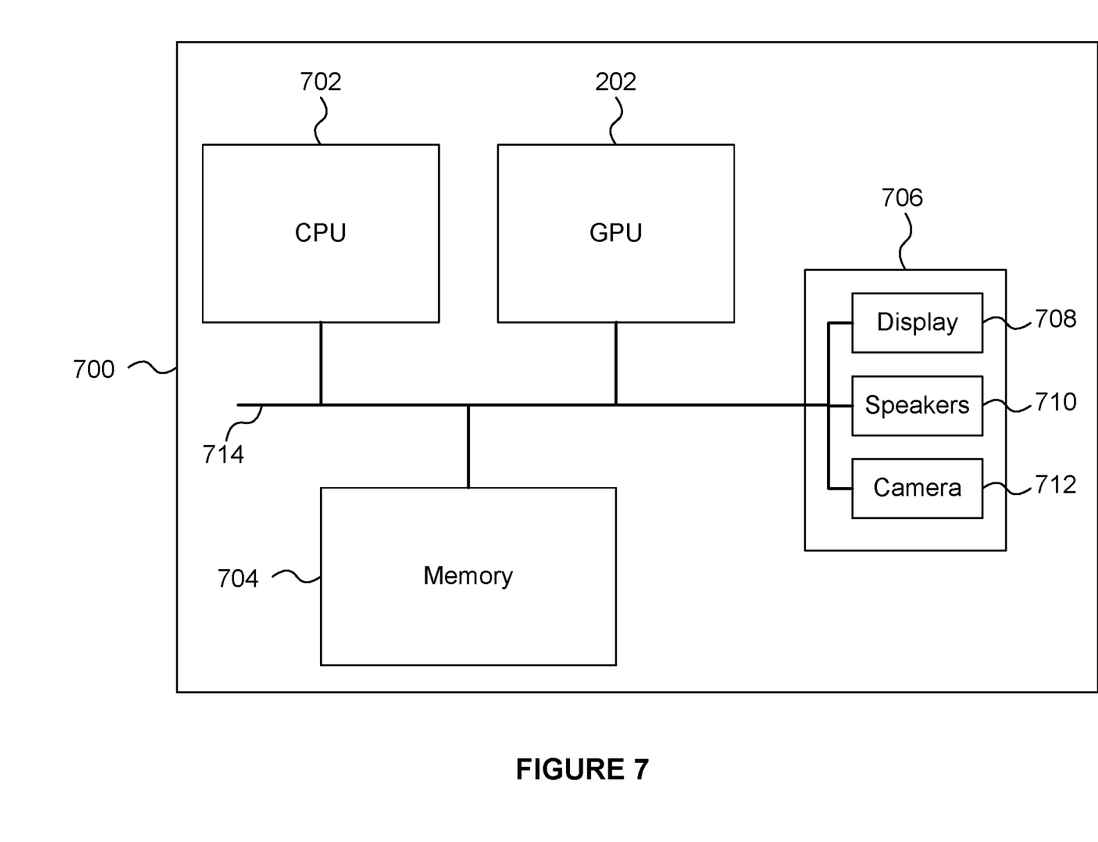
FIG. 7 shows a schematic diagram of a device implementing a graphics processing unit.

FIG. 7 shows a schematic diagram of a device 700 implementing a graphics processing system as described herein. The device 700 may for example be a smartphone, tablet or laptop or any other suitable computing device. The device 700 implements the graphics processing unit 202. The device 700 also comprises a CPU 702, a memory 704 and other devices 706, such as a display 708, speakers 710 and a camera 712. The memory 704 may include the memories $204_1$ and $204_2$ described above. The display 708 may be configured to display at least one of the rendered views of the scene provided by the GPU 202 in accordance with the examples described herein. The components of the device 700 can communicate with each other via a communications bus 714. The functionality of the GPU 202 may be implemented in hardware, software executed on hardware, or a combination thereof.

Figure 8:
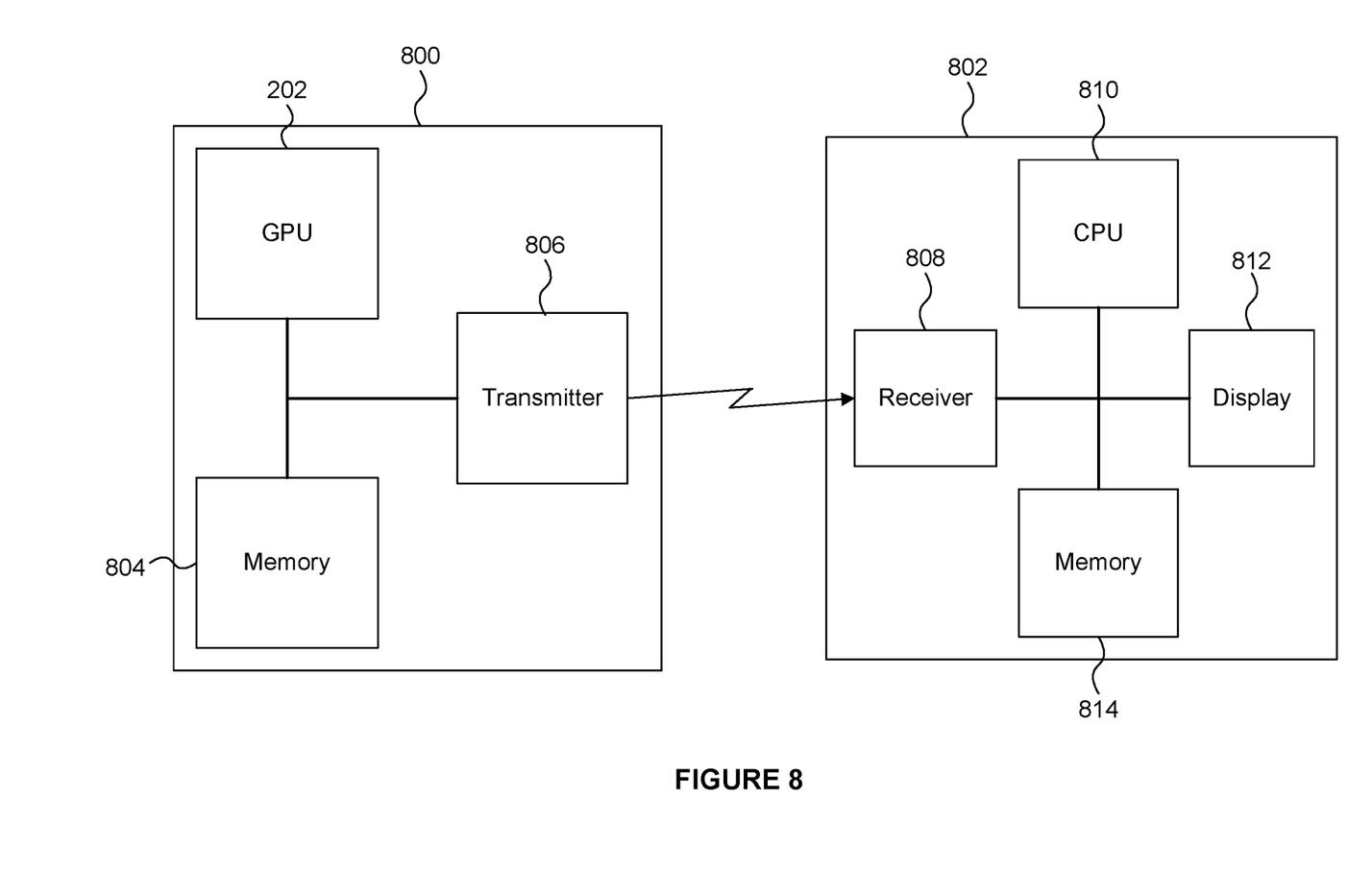
FIG. 8 shows a schematic diagram of a server implementing a graphics processing unit and a device including a display.

FIG. 8 shows a schematic diagram of a server 800 implementing a graphics processing system as described herein. FIG. 8 also shows a device 802 which may be any suitable computing device such as a smartphone, tablet or laptop. The server 800 implements the graphics processing unit 202. The server 800 also comprises a memory 804 and a transmitter 806. The memory 804 may include the memories $204_1$ and $204_2$ described above. The device 802 comprises a receiver 808, a CPU 810, a display 812 and a memory 814. The GPU 202 renders views of a scene as described above and the transmitter 806 may be configured to transmit the rendered views of the scene (possibly in compressed form) to the receiver 808 of the device 802. The device 802 can then display the rendered views of the scene on the display 812. The transmission of the rendered views of the scene from the server 800 to the device 802 may be done in any suitable manner, e.g. wirelessly, over the internet, over a telephone system, over a wired connection or any other suitable transmission method as would be known in the art. The functionality of the GPU 202 may be implemented in hardware, software executed on hardware or a combination thereof. In some examples, the GPU 202 may be rendering views of a scene for different users, and different rendered views may be transmitted to different devices for display thereon. This may be particularly useful if, for example, two users in different locations are playing a game and the rendering of the views is performed in the server 800.

In examples described above, the rendering of tiles in an interspersed order involves a tiling step to determine which primitives are relevant for rendering the different tiles (e.g. determining display lists) and then a rendering step of rendering a tile based on the primitives which are determined to be relevant for the rendering of that tile. In other examples, a separate tiling stage might not necessarily be implemented. For example, the primitives could be submitted to a rendering stage which has a viewport that discards primitives outside a given tile region. A frame could be built up by either submitting the primitives for the frame multiple times and moving the viewport around to new tile regions on each submission until the whole frame has been rendered, or multiple rendering units may operate in parallel each with their own viewpoint (i.e. tile region) such that they can operate together to render the different parts of the image. In these examples, it is still the case that by rendering tiles from different views of the scene in an interspersed order the cache hit rates can be improved.

In the examples described above, the graphics processing system 200 is a deferred rendering system. In other examples, a graphics processing system could be a non deferred rendering system in which texturing and/or shading is applied to fragments before hidden surface removal. In such non deferred rendering systems, the amount of data passed from the system memory to the GPU may be increased since some texture data may be fetched from the memory for texturing fragments which are then removed by the hidden surface removal because they are hidden from view. So non-deferred rendering systems might not be as optimal as deferred rendering systems, but the examples described herein could still be applied to non-deferred rendering systems.

Generally, any of the functions, methods, techniques or components described above can be implemented in modules using software, firmware, hardware (e.g., fixed logic circuitry), or any combination of these implementations. The terms "module," "functionality," "component", "block", "unit" and "logic" are used herein to generally represent software, firmware, hardware, or any combination thereof.

In the case of a software implementation, the module, functionality, block, unit, component or logic represents program code that performs specified tasks when executed on a processor (e.g. one or more CPUs). In one example, the methods described may be performed by a computer configured with software of a computer program product in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component, unit, block or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component, unit, block or logic may include circuitry that is fixed function and circuitry that can be programmed to perform a function or functions; such programming may be provided from a firmware or software update or control mechanism. In an example, hardware logic has circuitry that implements a fixed function operation, state machine or process. It is also intended to encompass software which "describes" or defines the configuration of hardware that implements a module, functionality, component, unit or logic (e.g. the components of the graphics processing unit 202) described above, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics processing system configured to perform any of the methods described herein, or to manufacture a graphics processing system comprising any apparatus described herein. The IC definition dataset may be in the form of computer code, e.g. written in a suitable HDL such as register-transfer level (RTL) code. An example of processing an integrated circuit definition dataset at an integrated circuit manufacturing system so as to configure the system to manufacture a graphics processing system will now be described with respect to FIG. 9.

Figure 9:
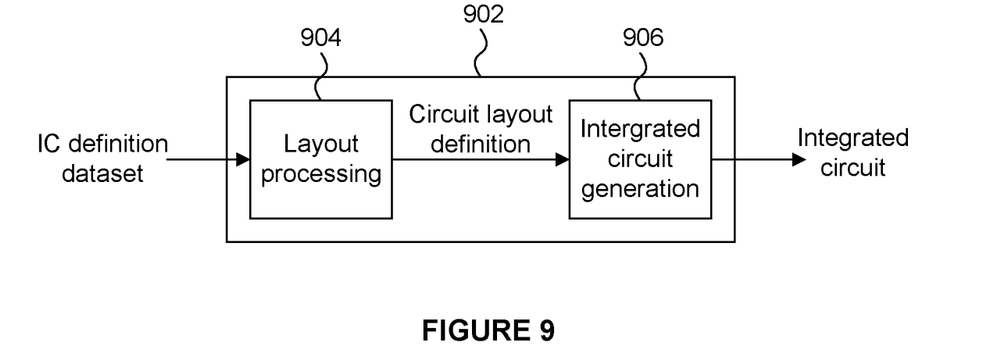
FIG. 9 shows an integrated circuit manufacturing system for generating an integrated circuit embodying a graphics processing system.

FIG. 9 shows an example of an integrated circuit (IC) manufacturing system 902 which comprises a layout processing system 904 and an integrated circuit generation system 906. The IC manufacturing system 902 is configured to receive an IC definition dataset (e.g. defining a graphics processing unit as described in any of the examples herein), process the IC definition dataset, and generate an IC according to the IC definition dataset (e.g. which embodies a graphics processing system as described in any of the examples herein). The processing of the IC definition dataset configures the IC manufacturing system 902 to manufacture an integrated circuit embodying a graphics processing unit as described in any of the examples herein. More specifically, the layout processing system 904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 904 has determined the circuit layout it may output a circuit layout definition to the IC generation system 906. The IC generation system 906 generates an IC according to the circuit layout definition, as is known in the art. For example, the IC generation system 906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 906 may be in the form of computer-readable code which the IC generation system 906 can use to form a suitable mask for use in generating an IC.

The different processes performed by the IC manufacturing system 902 may be implemented all in one location, e.g. by one party. Alternatively, the IC manufacturing system 902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some examples, an integrated circuit definition dataset could include software which runs on hardware defined by the dataset or in combination with hardware defined by the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

What is claimed is:

1. A method of rendering views of a scene in a graphics processing unit which is configured to use a rendering space which is subdivided into a plurality of tiles, the method comprising:
   rendering tiles of the views of the scene in an interspersed order such that, for each group of a plurality of groups of views of the scene, at least one tile from each of the views of the scene in the group is rendered before any of the views of the scene in the group are fully rendered, wherein at least one of the views of the scene in the group represents a sub-rendering for use in rendering another view of the scene in the group, and wherein the sub-rendering is a shadow map, an environment map or a texture for use in rendering the other view of the scene.

2. A graphics processing unit configured to render views of a scene, wherein the graphics processing unit is configured to use a rendering space which is subdivided into a plurality of tiles, the graphics processing unit comprising:
   a rendering unit configured to render tiles of the views of the scene in an interspersed order such that, for each group of a plurality of groups of views of the scene, at least one tile is rendered from each of the views of the scene in the group before any of the views of the scene in the group are fully rendered, wherein at least one of the views of the scene in the group represents a sub-rendering for use in rendering another view of the scene in the group, and wherein the sub-rendering is a shadow map, an environment map or a texture for use in rendering the other view of the scene.

3. The graphics processing unit of claim 2, further comprising:
   a tiling unit configured to, for each of the views of the scene, process primitives of the view of the scene to determine, for each of the tiles of the view of the scene, which of the primitives are relevant for rendering the tile;
   wherein the rendering unit is configured to use the determinations of which of the primitives are relevant for rendering tiles of views of the scene for rendering tiles of the views of the scene.

4. The graphics processing unit of claim 3, wherein the tiling unit is configured to, for each of the views of the scene, perform tiling on the primitives of the view of the scene to determine display lists for tiles of the view of the scene, wherein the display list for a tile indicates which of the primitives are relevant for rendering the tile;

wherein the rendering unit is configured to use the determined display lists for said rendering tiles of the views of the scene.

5. The graphics processing unit of claim 4, wherein the tiling unit is configured to transform primitives for a view of the scene into the rendering space for the view of the scene to determine which primitives are relevant for rendering the tiles of the view of the scene, and cause data relating to the transformed primitives to be stored in a primitive store, wherein the display list for a tile of the view of the scene indicates which of the transformed primitives are relevant for rendering the tile,
and wherein the rendering unit is configured to retrieve data relating to the transformed primitives which are relevant for rendering a tile from the primitive store for use in rendering the tile.

6. The graphics processing unit of claim 4, wherein the tiling unit is configured to transform primitives for a view of the scene into the rendering space for the view of the scene to determine which primitives are relevant for rendering the tiles of the view of the scene, wherein the display list for a tile of the view of the scene indicates which of the primitives are relevant for rendering the tile,
and wherein the rendering unit is configured to transform primitives for a view of the scene into the rendering space for the view of the scene for the purpose of rendering the tiles of the view of the scene.

7. The graphics processing unit of claim 2, wherein at least two of the views of the scene are images of the scene from respective different viewpoints.

8. The graphics processing unit of claim 2, wherein said sub-rendering and said another view of the scene relate to the same time instance.

9. The graphics processing unit of claim 2, wherein said interspersed order is such that the rendering unit is configured to render a tile at a first tile position from each of the views of the scene in a group, and to subsequently render a tile at a second tile position from each of the views of the scene in the group.

10. The graphics processing unit of claim 2, wherein the rendering unit is configured to use at least one transformation indicating tiles which are likely to be similar in different ones of the views of the scene in a group, wherein the interspersed order is based on the at least one transformation such that the rendering unit is configured to render similar tiles from the views of the scene in the group sequentially.

11. The graphics processing unit of claim 2, wherein said interspersed order that the rendering unit is configured to use is such that the view from which a next tile is rendered is changed after rendering a set of one or more tiles from a particular view, wherein said set does not include all of the tiles of the particular view of the scene.

12. The graphics processing unit of claim 2, wherein the rendering unit comprises control logic configured to determine which tile is to be rendered after a particular tile has been rendered.

13. The graphics processing unit of claim 12, wherein the control logic is configured to determine which tile is to be rendered after a particular tile has been rendered by:

obtaining at least one motion vector indicating motion between the particular tile of a particular view and regions of a different view; and
selecting a tile to be rendered after the particular tile based on the obtained at least one motion vector.

14. The graphics processing unit of claim 13, wherein the control logic is configured to determine which tile is to be rendered after a particular tile has been rendered by:
analysing at least one previous view of the scene to determine respective measures of similarity between a tile at the tile position of the particular tile and tiles at other tile positions; and
selecting a tile to be rendered after the particular tile based on the similarity measures.

15. The graphics processing unit of claim 2, further configured to use, for each of the views of the scene in a group, a respective buffer for storing indications of the results of rendering the tiles of the respective view of the scene.

16. The graphics processing unit of claim 2, further comprising at least one cache, wherein the graphics processing unit is configured to:
fetch data from a memory for use by the rendering unit in rendering a tile; and
store fetched data in the at least one cache.

17. The graphics processing unit of claim 2, wherein the rendering unit comprises:
a hidden surface removal module configured to perform hidden surface removal on at least some fragments of primitives that are relevant for rendering a tile; and
a processing module configured to perform at least one of texturing and shading on at least some of the fragments of primitives that are relevant for rendering the tile.

18. The graphics processing unit of claim 2, wherein the graphics processing unit is implemented on a device which includes a display, wherein the device is configured to display at least one of the rendered views of the scene on the display.

19. A non-transitory computer readable storage medium having stored thereon an integrated circuit definition dataset that, when processed in an integrated manufacturing system, configures the system to manufacture a graphics processing unit configured to render views of a scene, wherein the graphics processing unit is configured to use a rendering space which is subdivided into a plurality of tiles, the graphics processing unit comprising:
a rendering unit configured to render tiles of the views of the scene in an interspersed order such that, for each group of a plurality of groups of views of the scene, at least one tile is rendered from each of the views of the scene in the group before any of the views of the scene in the group are fully rendered, wherein at least one of the views of the scene in the group represents a sub-rendering for use in rendering another view of the scene in the group, and wherein the sub-rendering is a shadow map, an environment map or a texture for use in rendering the other view of the scene.

* * * * *